Nov. 29, 1966     H. FEHLMANN     3,288,128
SETTING DEVICE FOR A RING-SHAPED SAW BLADE
Filed Sept. 22, 1964
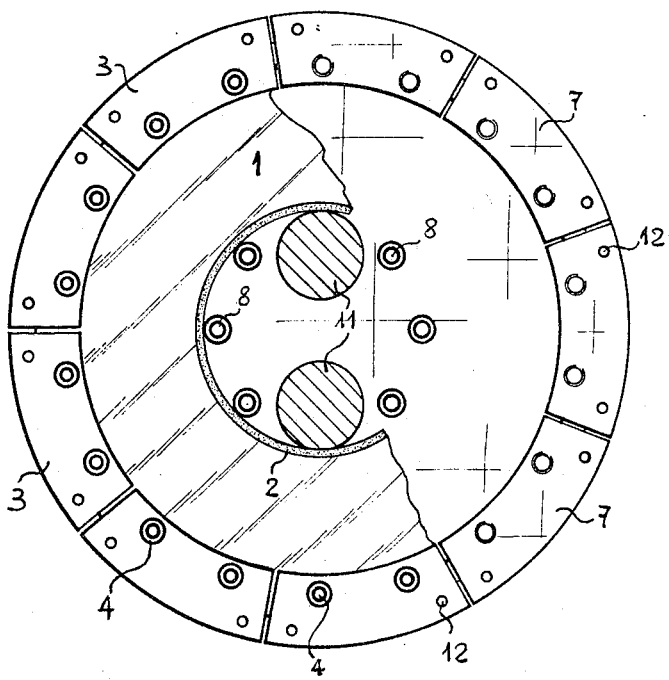
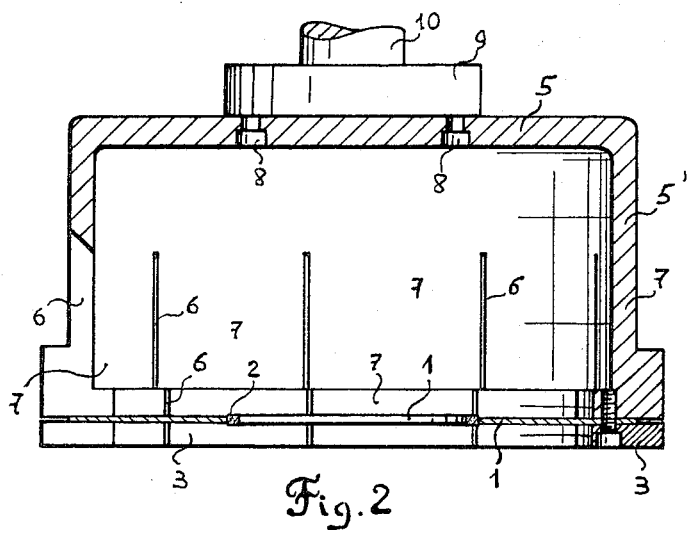
INVENTOR
HENRI FEHLMANN
BY Paul M. Craig, Jr.
ATTORNEY

United States Patent Office 3,288,128
Patented Nov. 29, 1966

3,288,128
SETTING DEVICE FOR A RING-SHAPED SAW BLADE
Henri Fehlmann, Courtelary, Bern, Switzerland
Filed Sept. 22, 1964, Ser. No. 398,361
Claims priority, application Switzerland, Sept. 24, 1963, 11,798/63
7 Claims. (Cl. 125—15)

This invention relates to a novel and improved setting device for ring-shaped saw blades, more particularly for ring-shaped saw blades destined for cutting into fine slices hard metals or alloys and other hard materials.

Several kinds of annular saws have been proposed in the past for cutting hard metals, but experience shows that the blades of such saws which are rigidly mounted on a rotating blade holder, become considerably deformed as a result of the centrifugal force acting on the blade when high rotation speed is reached. This causes the saw-cuts to become irregular, the thickness of the slices unequal and excessive for certain uses, and generally speaking the performances of such rigidly mounted saw blades are inadequate for rational working.

It is an object of this invention to remedy these inconveniences by providing a ring-shaped saw capable of rotating at very high speeds without its blade becoming deformed, thus facilitating the cutting of hard materials into slices of an extreme thinness never attained before, e.g. in the case of a ruby, into slices not exceeding 0.12 mm. in thickness.

This and other objects and advantages have been attained according to the invention by a ring-shaped saw wherein the ring-shaped blade is attached by its outer peripheral portion to a bell-shaped rotary holder whose rim is split into at least three sectors of substantially equal size by means of slits extending over at least a part of its depth.

The annexed drawing shows by way of example a setting device for a ring-shaped saw blade embodying the invention.

FIG. 1 is a front elevational view thereof, and
FIG. 2 a side elevational view partly in section.

With reference to the drawing, the setting device comprises a ring-shaped saw blade 1 with a diamond-set inner edge 2 attached by its outer peripheral portion by means of annular segments 3 and screws 4 to a bell-shaped blade holder 5 whose rim member or flange 5′ is divided by slits 6 into nine equal segments 7. The slits 6 extend substantially over one half of the depth of the rim member 5′. The bottom portion of the bell-shaped holder 5 is fixed by screws 8 to a collar 9 of the driving shaft 10. Positioning pins 12 join together the annular segments 3 with the sectors 7 of the rim member 5′. The latter together with the segments 3 constitute a rim means. Numeral 11 denotes two bars of hard material, as for example germanium, to be sliced up.

When the bell-shaped blade holder begins to rotate, the centrifugal force tends to cause the sectors 7 of the holder to spread out from the axis of rotation. It has been observed in the case of a ring-shaped saw blade of 0.05 mm. thick nickel sheet having an inner diameter of 110 mm. rotating at 3500 r.p.m. that this inner diameter increases from 110 mm. to 110.5 mm., and that if the holder runs idle, i.e. without blade, the sectors may part to the extent of 0.8 mm. from the axis. Thus, thanks to the rim member 5′ of the bell-shaped holder being divided into sectors, hence to the non-rigid setting of the annular blade, the latter constantly remains perfectly spanned, being able to work at high speed without any deformation. Consequently, it becomes possible to cut extremely thin slices of any hard material which are perfectly uniform in thickness and free from burrs; as an example, it is possible to produce by means of a ring-shaped blade having a diamond-set inner edge of 0.10 mm., slices of such hard metal as germanium of absolutely uniform thickness of 0.15 mm.

The number of sectors of the bell-shaped holder may be reduced to three, according to the size of the annular blade and the working speed normally applied. It is possible to cut simultaneously up to three bars of hard material. Obviously, a known feeding mechanism, possibly with pendular motion, must be provided for feeding the work pieces.

The width of the slits may advantageously be up to 2 mm.

The rim of the bell-shaped blade holder may also be made in two pieces, viz an outer ring divided into segments screwed on to an annular inner body without slits or with slits of low height.

I claim:
1. A setting device for a thin ring-shaped saw blade having an internal cutting edge and subject to rotation, including means preventing deformation of said saw blade during said rotation, said device comprising a bell-shaped holder including a bottom portion and rim means attached to the outer periphery of and supporting said blade, said rim means including a rim member having an open end portion and supported by said bottom portion, said means preventing deformation including means dividing said open end portion into at least three separate equal sections symmetrically disposed relative to the axis of said rotation including slits in said open end portion parallel to said axis, said rotation expanding said sections to prevent said deformation.

2. A device according to claim 1, said means preventing deformation further comprising means for fixing said blade to said open end portion including annular segments and screws freely passing through the outer peripheral portion of said blade and into said open end portion.

3. A device according to claim 1, wherein said rim member is integral with said bottom member and forms therewith a single piece.

4. A device according to claim 1, wherein said rim means comprises two portions, namely an outer portion constituted of separate annular segments, and an inner portion constituted by said rim member, said outer portion being secured to said inner portion.

5. A device according to claim 1, wherein said slits extend substantially over half of the height of said rim member.

6. A setting device according to claim 1, wherein said rim means supporting said blade include a plurality of equal annular segments engaging a face of the outer peripheral portion of said blade and means including positioning pins joining together said sectors, said blade and said annular segments.

7. A setting device according to claim 6, wherein said means including positioning pins further includes screws connecting said sectors and said segments.

References Cited by the Examiner

UNITED STATES PATENTS

| 1,511,165 | 10/1924 | Jaeger | 51—73 |
| 2,638,084 | 5/1953 | McLaughlin | 51—73 |
| 2,713,339 | 7/1955 | Sayers | 125—15 |
| 3,039,235 | 6/1962 | Heinrich | 51—73 |
| 3,117,398 | 1/1964 | Meyerhoff | 51—73 |

HAROLD D. WHITEHEAD, *Primary Examiner.*